(No Model.)
R. S. PENNIMAN.
PROCESS OF MANUFACTURING NITRATE OF AMMONIA.
No. 448,361. Patented Mar. 17, 1891.
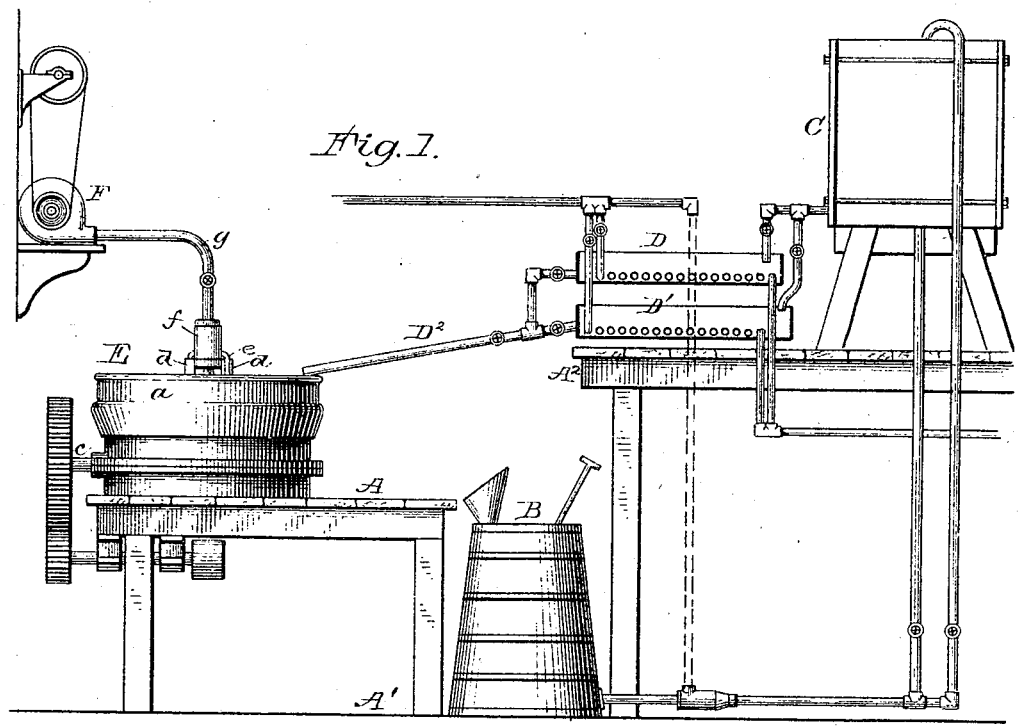
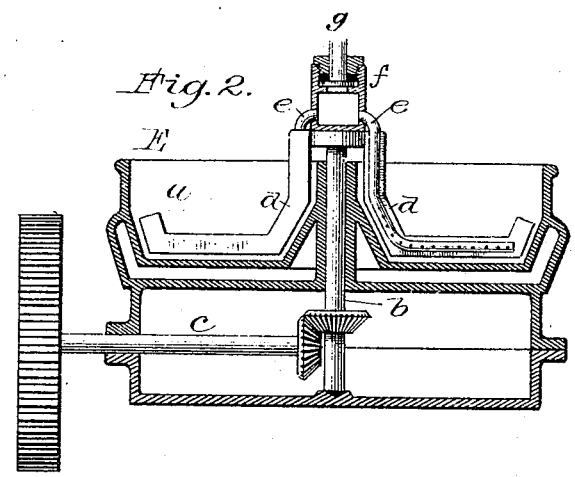
Attest:
Philip F. Larner.
Howell Bartle.
Inventor:
Russell S. Penniman.
By  Attorney.

UNITED STATES PATENT OFFICE.

RUSSELL S. PENNIMAN, OF DOVER, NEW JERSEY.

PROCESS OF MANUFACTURING NITRATE OF AMMONIA.

SPECIFICATION forming part of Letters Patent No. 448,361, dated March 17, 1891.

Application filed July 11, 1888. Serial No. 279,649. (No specimens.)

*To all whom it may concern:*

Be it known that I, RUSSELL S. PENNIMAN, of Dover, in the county of Morris and State of New Jersey, have invented certain new and useful Improvements in the Manufacture of Nitrate of Ammonia, with special reference to its adaptation for use in explosive compounds; and I do hereby declare that the following specification, taken in connection with the drawings furnished and forming a part of the same, is a clear, true, and complete description of my invention.

I have heretofore given much attention to the development of the practical value of nitrate of ammonia in explosive compounds containing nitro-glycerine and have succeeded in overcoming many of the pre-existing difficulties attendant upon said use by reason of the improvements in protected nitrate of ammonia disclosed by me in Letters Patent No. 312,010, dated February 10, 1885. The necessity, however, for more cheaply producing the protected nitrate has heretofore constituted a serious drawback to its use in a practical way and on a large scale, inasmuch as the cost of such nitrate as was ordinarily available in the market from time to time, added to the cost of remelting and granulating or grinding and drying, placed it beyond the range of practical commercial operations in the manufacture of explosive compounds. Moreover, in remelting and granulating the nitrate I have found it extremely difficult to secure that degree of fineness and uniformity of granulation which is important for obtaining the best results in explosive compounds, and although grinding and screening operations may be relied upon for obtaining said fineness and uniformity their comparatively high cost and the liability meantime of absorbing moisture from the atmosphere render them undesirable.

So far as my knowledge extends, nitrate of ammonia has always been heretofore developed into its solid or salt form from any brine containing said salt in solution by reducing the brine or liquor by evaporation to such strength that when allowed to cool the salt would be developed by the ordinary process of crystallization. The crystals were then removed, drained, and their surfaces dried, the remaining brine being further heated and reduced, cooled again, and the crystallizing process repeated, and so on with or without the mingling of fresh brine with that from which the crystals had been developed. In order that the crystallized salt might be in a measure better protected against deliquescing during atmospheric exposure, the crystallized nitrate has heretofore been subjected to a heat sufficient to melt it and enable it to be molded into block form, thus for a given weight of nitrate reducing its area of exposure as compared with the same weight in a crystallized form. The crystals are never and can never be well dehydrated, and the water contained therein enables them to be readily melted and molded, as described; but in this operation the salt will part with but little if any of its water.

In accordance with my invention the brine is exposed to evaporation and converted into a condition far beyond the crystallizating strength, and it is further exposed to temperatures much higher than have heretofore been requisite either for producing crystals or for melting such crystals, and this is done under conditions which do not endanger the salt with respect of decomposition, and which result, as I believe, for the first time in the development of solid nitrate in a thoroughly dehydrated condition and much more rapidly and at less cost than by the crystallizing process.

It it is obviously important that the nitrate of ammonia should be as free as possible from foreign matter, and, while having in view economy in its production, I have also provided for obtaining it in its best possible form for the uses indicated.

The main feature of my present invention consists in the granulation of the nitrate of ammonia in the presence of a protecting medium, which is mixed therewith while the nitrate is in a melted condition, so that as the granulation proceeds during the gradual cooling and agitation of the melted nitrate the grains or solid particles thereof are promptly coated with or enveloped by the protecting medium, and hence the grains are exceedingly fine and uniform. This portion of my invention does not depend upon the form or condition of the nitrate prior to its being in a melted condition, provided that prior to the introduction of the protecting medium the nitrate has been properly dehydrated; but with a view to obtaining the best economic results I introduce the protecting medium at the close of the process of manufacturing the nitrate, it then being in a melted condition, so that protected nitrate of ammonia is for the first time initially produced by me as distinguished from protecting nitrate, which, having already been developed into a solid condition, is grained after remelting or made fine by grinding. When the nitrate has been remelted, or when it is in its initially-melted condition, the elimination of water or moisture therefrom by former methods involves the expenditure of much heat and time, and if speed be sought by employing unduly high temperatures the character of the nitrate is liable to be impaired, and hence to obviate the latter and to economize in heat and time I freely inject air into the mass of melted nitrate while the latter is mechanically agitated. This use of the air-blast is entirely novel in this connection. The air not only serves as a vehicle for conveying moisture from the mass, but it also enables me to employ in the graining apparatus temperatures higher than would be safe or proper without its use and to reduce the time required for drying the nitrate to a minimum.

While the use of air as described is of great practical value in drying remelted nitrate, it is of far greater value in not only drying initially-melted nitrate, but in rapidly eliminating water from the concentrated solution from which the grained nitrate is developed.

The best results attainable from my invention, both as to economy and in the quality of the protected nitrate, accrue when, as in practice, I commence with the most available ammoniacal liquors in such concentrated forms as are common in the trade, and after treating them with nitric acid provide specially ample opportunities for precipitation prior to the introduction of the liquor into the vessel of that part of the apparatus in which the grained nitrate is developed.
In more particularly describing my invention I will refer to the accompanying drawings, in which—

Figure 1 illustrates a complete apparatus as devised by me for the production of protected nitrate of ammonia in accordance with my invention. Fig. 2 illustrates in vertical central section the portion of the apparatus in which the protected grained nitrate is developed.
In Fig. 1, A denotes a platform, upon which the acids and ammoniacal liquors are received, and upon which the finished product is taken into suitable receptacles from the apparatus. Upon a lower floor $A'$ the mixing-tank B is placed, its top being conveniently accessible from the platform A. This mixing-tank is provided with a suitable cover and a funnel-shaped spout for facilitating the delivery of the liquor and acids therein, and it should be provided with a stirrer whether operated by hand or by other power. This tank B is coupled to each of a series of settling-tanks C on a trestle upon an elevated platform $A^2$ by means of suitable pipes provided with a steam-ejector or a suitable pump for transferring the contents of the mixing-tank to the settling-tanks. On the platform $A^2$, below the level of the settling-tanks, concentrator-pans are located. A series of these concentrating-pans should be used, although but two are here shown at D and $D'$, one being above the other, and each is provided with a steam-heating coil. These pans are connected by suitable piping provided with cocks, which enable the contents of either to be discharged by way of pipe $D^2$ or the contents of the upper pan to be transferred to the lower, if need be, although both pans are provided with pipes and cocks, so that both may be separately supplied with liquor from the settling-tank, if occasion requires.

The graining and coating apparatus E is located so as to be conveniently accessible from the platform A, and it consists of a circular jacketed pan $a$, provided with a central hub, within which there is a vertical shaft $b$, geared at its foot to a driving-shaft $c$. The shaft $b$ at its upper end carries a series of pendent stirring-arms $d$, which occupy the pan and serve as mechanical agitators. To one or more of said arms $d$ bent perforated pipes $e$ are attached, and these at their upper ends communicate with an air-chamber $f$, which has a gland-sleeve coupling, to which one end of the air-pipe $g$ is attached, its other end being coupled to a blower F or other suitable air-pump. The pan $a$ is specially adapted to such variations in expansion and contraction as will be incident to the alternate use of steam and cold water in the jacketing-spaces.

As a rule, the most available ammoniacal liquors are those concentrated from the wash-waters of gas-works. These concentrated liquors usually carry about fifteen per cent. of available ammonia in the form of carbonates and sulphides. My mixing-tank B has a capacity of about one thousand gallons, and I prefer to work therein about five hundred gallons of the liquor, varying the quantity according to the strength of the liquor and acids used. Into the partially-filled tank I introduce nitric acid in such quantity as will leave the mixture slightly alkaline, and the mixture is well stirred from time to time. The contents of the mixing-tank are then transferred to a settling-tank C, where it is allowed to rest, say, from four days to a week for allowing certain impurities to be precipitated. The nitrated liquor is then drawn into one or more of the concentrating-pans D $D'$, which, being comparatively shallow and having ample steam-heating pipes therein, can be made to operate quite rapidly in evaporating from ninety to ninety-five per cent. of the water. After the nitrated liquor has been thus far concentrated the steam is cut off, and during from two to four hours opportunity is afforded for the further precipitation of impurities, and this I deem specially desirable, because however clear the liquor may appear on leaving the settling-tanks C, I find that the heating thereof in the concentrating-pan develops considerable quantities of objectionable impurities, which are precipitated during this second opportunity for settling. The upper concentrating-pans may be used wholly for evaporation and the lower ones only for settling, if desired, in which case the heating-pipes in the lower pans need be supplied with only sufficient steam to maintain the liquor at any desired temperature, or the steam may be cut off entirely. The liquid delivered from these concentrating-pans contains from five to ten per cent. of water, and it is generally as much a liquefied nitrate with respect of the water therein as when the nitrate has been heretofore liquefied by melting the crystals; but I thereafter thoroughly eliminate the water by means of high temperatures and injected air, leaving the salt in a thoroughly dehydrated and melted condition.

The settled nitrated liquor is delivered in desirable quantities to the graining apparatus E, the pan a of which may be of any desired dimensions. I deem it generally desirable that the settled nitrated liquor be utilized by the use of a small quantity of oxide of zinc, which I mix with the liquor in the graining-pan, using, say, two pounds of the oxide to each one hundred pounds of the nitrate. I find that about thirty minutes' exposure to a temperature of at least 310° Fahrenheit is generally required, and I deem it inexpedient to allow the temperature to ever exceed 320° Fahrenheit, because of the tendency at that heat for ammonia to be expelled with accompanying decomposition and development of acid. Steam having been applied to the pan, the stirring-arms are set in motion and air from the blower is freely delivered at the bottom of the mass, and the air rising through it not only speedily carries away moisture, but it also prevents the mass from being unduly heated, even though the pan itself may be heated much above 320°, thus enabling the dehydrating operation to be rapidly executed without danger of impairing the nitrate. After, say, about thirty minutes no vapors will be seen rising with the air, and then the steam and the air are cut off; but the stirring-arms are kept in motion. Cold water is then admitted to the jacket-space, which was before occupied by the steam, and the protecting medium or coating is put into the pan. This coating medium may be any one of the soft educts or products of petroleum distillation or a compound thereof; but for obtaining the best results I use what is known as "vaseline"—say thirteen pounds thereof to eighty-seven pounds of the nitrate. The graining of the nitrate in the presence of the protecting medium is conducive to the development of small fine grains, specially desirable for use in explosive compounds. At some portions of the stirrer-arms and on the interior of the pan the nitrate sometimes cakes a little, so as to form occasional lumps; but the main bulk of the protected nitrate is finely and uniformly grained.

I am aware that blasts of air have been widely used in various processes for facilitating evaporation; but I believe I am the first to employ them in the dehydration of nitrate of ammonia, not only with a view to rapid service, but also for obviating the acid decomposition which is liable from unduly high temperatures, and thereby rendering the product specially valuable for use in explosive compounds. With the most efficient mechanical agitation alone while the melted nitrate is heated even up to 320° no perceptible vapors will be eliminated; but if then the air-blasts be injected at the bottom of the mass their value will be at once apparent in promptly reducing the temperature to a safer point, and for several minutes considerable volumes of watery vapor will rise from the mass.

By following out my entire process as indicated protected nitrate of ammonia can be produced in its best possible form and at a minimum of cost, the latter being a mere fraction of the cost involved in the purchase of nitrate of ammonia in its usual market form and in treating it as heretofore by me.

It is to be understood that those features of my present invention which do not include the introduction of the protecting medium into the liquefied nitrate will be made the subjects of separate applications for Letters Patent. (See Serial Nos. 362,483 and 362,484.)

Having thus described my invention, I claim as new and desire to secure by Letters Patent—

1. The improvement in the process of manufacturing protected nitrate of ammonia, which consists in dehydrating the nitrate, then while the nitrate is in a melted condition mixing therewith a protecting medium, then cooling the mass and graining the nitrate by agitation in the presence of the protecting medium, substantially as described.

2. The improvement in the process of manufacturing protected nitrate of ammonia, substantially as hereinbefore described, which consists in mixing nitric acid with ammoniacal liquor and settling the nitrated liquor, then concentrating the liquor by evaporating therefrom the main portion of its water, then dehydrating the nitrate, then mixing with the nitrate while it is in its initially-melted condition a grain-protecting medium, and finally cooling the mass and developing it into coated or protected grains of nitrate by agitation in the presence of the protecting medium.

3. The improvement in the process of producing protected nitrate of ammonia, substantially as hereinbefore described, which consists in combining the protecting medium with the nitrate while the latter is in a liquefied and dehydrated condition and then developing the mass into a grained condition by cooling and mechanical agitation.

RUSSELL S. PENNIMAN.

Witnesses:
 ROBERT KILLGORE,
 EDW. D. NEIGHBUR.